United States Patent
Straub

[11] 3,719,119
[45] March 6, 1973

[54] DRIFT PIN ALIGNMENT CLAMP

[76] Inventor: Richard K. Straub, R.D. No. 2, Douglass Road, Beaver Falls, Pa. 15010

[22] Filed: May 17, 1971

[21] Appl. No.: 144,177

[52] U.S. Cl. ..................................... 85/70
[51] Int. Cl. ............................. F16d 13/06
[58] Field of Search ........ 85/70, 71, 81, 1 P, 5 B, 5 E, 85/5 M, 5 R

[56] References Cited

UNITED STATES PATENTS

| | | | |
|---|---|---|---|
| 330,119 | 11/1885 | Holden | 85/71 |
| 2,190,386 | 2/1940 | Scholtes | 85/5 B |
| 2,256,634 | 9/1941 | Webb | 85/5 M |
| 2,278,217 | 3/1942 | Rodanet | 85/70 |
| 2,353,248 | 7/1944 | Lamb | 85/70 |
| 2,372,904 | 4/1945 | McCarthy | 85/70 |
| 2,563,994 | 8/1951 | Dougherty | 85/70 |
| 3,093,026 | 6/1963 | Milis et al. | 85/70 |

FOREIGN PATENTS OR APPLICATIONS

| | | | |
|---|---|---|---|
| 866,258 | 4/1961 | Great Britain | 85/70 |
| 680,232 | 8/1939 | Germany | 85/5 E |

*Primary Examiner*—Marion Parsons, Jr.
*Attorney*—Clarence A. O'Brien and Harvey B. Jacobson

[57] ABSTRACT

A drift pin alignment clamp comprising first and second insert members threadedly engaging each other with a compressible rubber collar mounted therebetween for expansion due to compression created by threading the first and second members toward each other, the first and second members and rubber collar each being adapted to be inserted through construction beam apertures to aid in their alignment and to secure the beams in flush engagement with each other by expanding the rubber collar after insertion. The first insert member has a tapered tip portion which aids in the insertion when the beams are initially slightly out of alignment, and a tightening knob at the end opposite the tip for easily expanding the rubber collar after insertion.

4 Claims, 3 Drawing Figures

PATENTED MAR 6 1973 3,719,119

Richard K. Straub
INVENTOR.

BY *Clarence A. O'Brien*
and *Harvey B. Jacobson*
Attorneys

DRIFT PIN ALIGNMENT CLAMP

The present invention is generally related to clamping devices, and, more particularly, to alignment clamps for aligning and temporarily clamping heavy construction beams to be riveted together.

Almost all heavy construction today requires the use of steel beams, such as I-beams, which must be riveted together by the riggers on the construction site. The construction beams must be lined up, such that their mounting holes by which they are to be riveted or bolted together are properly aligned. In the past, it has been the practice to temporarily hold the beams in alignment by way of a pin, or similar object, which was inserted through the aperture of one beam and then into the corresponding aperture of the other beam. However, while such an arrangement was acceptable for smaller beams, or for beams which were in some way restrained against movement, it was not feasible for heavier beams, often weighing thousands of pounds, susceptible to swinging or other movement on the end of a crane cable. Even though initial alignment was achieved with the pin, such pins could not maintain the beams in flush engagement with each other long enough for the initial rivets to be driven.

Although many alignment pins and clamps have been proposed, such constructions have been unacceptable due to the number of parts and due to the fact that disassembly was often necessary, further complicating the procedure and often resulting in parts being accidentally dropped. Furthermore, these conventional constructions required that the rigger have access to both sides of the apertures in order to utilize the clamping device, such often requiring workers on both sides of the beam apertures.

It is an object of the present invention to provide a versatile rigger's beam clamp which may be operated by a single person alone, having access to only one side of the construction beam apertures.

Another object of the present invention is to provide a novel drift pin alignment clamp which has a relatively small number of component pieces, which may be easily carried in one's pocket from place to place, and which does not require dismantling or separation of any of its component pieces during the clamping operation.

It is a further object of the present invention to provide a unique alignment and clamping device having an expandable rubber collar which is inserted through the apertures of heavy construction beams and expanded to maintain the apertures in alignment and to secure the construction beams in flush engagement with each other until the initial rivets have been driven.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3:
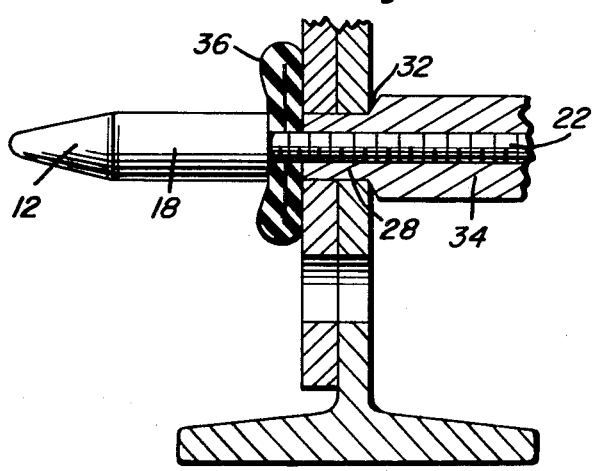

And FIG. 3 is an enlarged sectional view of the alignment clamp in engagement with a pair of aligned beam apertures with the rubber collar expanded.

Figure 1:
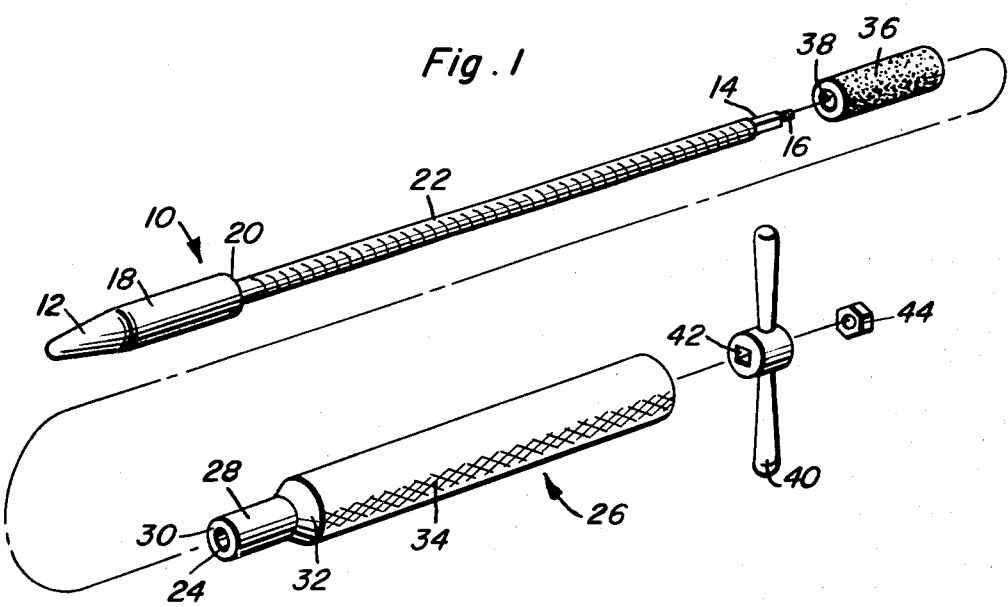
FIG. 1 is an exploded perspective view of the alignment clamp of the present invention.

Referring now more specifically to FIG. 1, the component pieces of the alignment clamp can be easily seen. The alignment clamp includes a first elongated insert member generally indicated by the numeral 10, made of tempered steel, or the like, and having a tapered tip potion 12 at one end thereof and an elongated shank portion 14 at the opposite end thereof with a threaded section 16 extending therefrom. Tapered tip portion 12 joins a cylindrical section 18 which terminates at an inwardly directed shoulder 20. The first insert member also includes a section of threaded shaft 22 extending between the shoulder 20 and shank portion 14, and is adapted to engage a corresponding internal thread 24 of the second elongated insert member 26. The second insert member is provided with a cylindrical section 28, of a diameter similar to that of cylindrical section 18 and extending between a shoulder 30 and a frusto-conical surface 32 which extends outwardly and terminates at a knurled handle surface 34.

A resilient collar 36, which is normally cylindrical in shape has a longitudinal aperture 38 extending therethrough and fits over the threaded shaft portion 22 of the first insert member for engagement with shoulder 20. Shoulder 30 of the second insert member is adapted to engage the opposite end of resilient collar 36 when the second insert member is threaded onto the first insert member. A tightening knob 40 provided with a mounting hole 42, which is adapted to engage shank portion 14, with fastening nut 44 engaging threaded section 16 to hold the tightening knob firmly in place.

Figure 2:
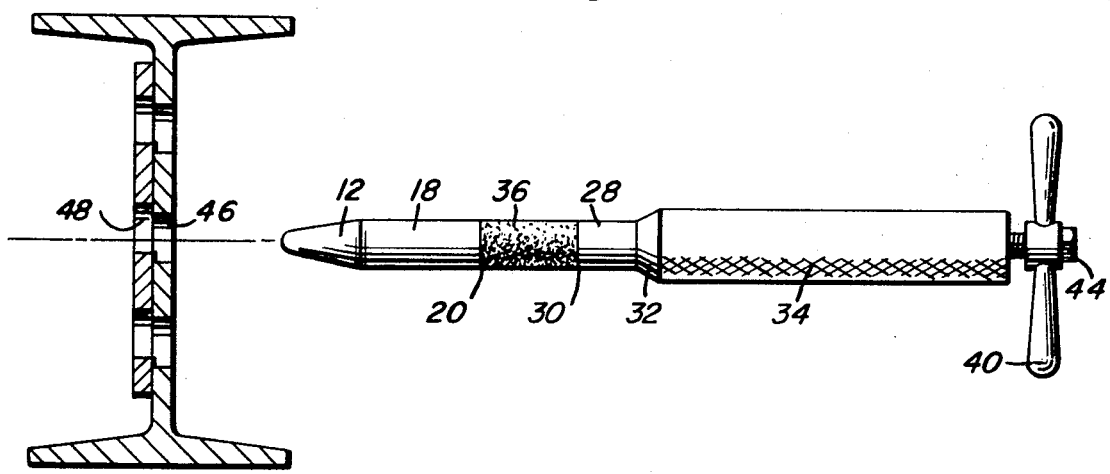
FIG. 2 is an elevational view of the assembled alignment clamp shown in FIG. 1 adjacent to a pair of beams with apertures therein.

Referring now to FIG. 2 the alignment clamp is shown in the assembled condition, ready for insertion into a pair of construction beam apertures, such as apertures 46 and 48. As illustrated, aperture 48 is slightly out of alignment with aperture 46. It is appreciated, that as the tapered tip portion 12 is inserted, aperture 48 will slide over the conical surface to eventually bring it into alignment with corresponding aperture 46. Cylindrical sections 18 and 28 are of a diameter slightly less than the diameter of apertures 46 and 48, such that they may be easily slid through the apertures, yet are in snug engagement with the aperture side walls. The alignment clamp is slid into the apertures until one of the beams abuts the frusto-conical surface 32, as shown in FIG. 3. In the preferred embodiment, cylindrical surface 28 is of a length corresponding to the composite thickness of the beams. Resilient collar 36 is made of a flexible material, such as synthetic rubber, or the like, such that it is expanded and deformed outwardly from its normally cylindrical shape when compressed at its ends.

The resilient collar is shown in its compressed deformed condition in FIG. 3, the deformation being such that the collar engages outer portions of one of the beams immediately adjacent to its aperture. Compression and deformation of the resilient collar is achieved by threading the second insert member 26 onto the first insert member 10, such that shoulders 20 and 30 apply forces on the ends of the collar. These compression forces eventually deform the collar to a condition shown in FIG. 3. Compression is easily achieved by rotating tightening knob 40 relative to knurled surface 34 of the second insert member. This is done by gripping the knurled surface with one hand and rotating the tightening knob with the other hand.

It is appreciated, that the alignment clamp of the present invention may be operated by one person alone, and its use requires that the operator have access to only one side of the beam apertures, where conventional constructions often required a worker on each side of the beam apertures. Furthermore, many conventional constructions required disassembly of the component pieces during the clamping operation. This often led to accidental dropping or misplacement of the pieces, resulting in delays and, sometimes, a work stoppage of the entire construction crew. Thus, the drift pin alignment clamp of the present invention not only solves the problems of securing and aligning the construction beams, but also performs the task with the aid of a single operator and without disassembly of the clamp, thus reducing the costs of the alignment operation.

In the preferred embodiment, the knurled handle surface 34 is cylindrical in shape. However, if desired, different shape surfaces may be provided such as oval cross-section or finger indentations. Furthermore, it may be desirable to provide a selection of second insert members 34, each having a cylindrical section 28 of a different diameter, corresponding to different diameter apertures. It should be noted, that while cylindrical section 18 is shown to have a diameter corresponding to the aperture diameter, it is not essential that it be so. If desired, cylindrical section 18 may be of a diameter substantially less than that of the beam apertures through which it passes, so long as cylindrical section 28 is of a diameter approximating the aperture diameter and may be readily inserted therein. Thus, it may be advantageous to provide the first insert members having different size diameters, such that they do not differ in size substantially from the diameter of cylindrical sections 28. Minor changes in the shape of the components, thread construction, or the manner in which the tightening knob is fastened to the first insert member are deemed to fall within the scope of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An alignment clamping device for aligning and clamping a plurality of apertured members, said device comprising a first insert member including an end portion for insertion through the apertures, said end portion being provided with a first shoulder, said first insert member including an externally threaded shaft portion integral with said end portion and extending axially therefrom, a second insert member with a threaded axial bore extending therethrough and in threaded engagement with said threaded shaft portion of said first insert member, one end of said second insert member defining a second shoulder, a tubular, resilient, deformable member disposed over a portion of said threaded shaft between said first and second shoulders, said end portion of said first insert member and said second insert member each having an outer surface coextensive with said tubular member when undeformed for insertion through the apertures, said outer surface associated with said second insert member extending between said second shoulder and a generally conical surface diverging outwardly and being of length corresponding to the composite length of the apertures in which it is to be inserted, such that said second shoulder is flush with one end of the apertures, a knob mounted non-rotatably to the end of said first insert member opposite said one end for manual rotation of said first insert member relative to said second insert member, and means removably fastening said knob to said first insert member for convenient disassembly of said clamping device to provide a second insert member with said surface of appropriate length corresponding to the composite length of the apertures to be aligned.

2. The structure set forth in claim 1 wherein said fastening means includes a threaded member in engagement with threads on said opposite end of said first insert member.

3. The structure set forth in claim 2 wherein said one end portion of said first insert member is tapered for easy insertion through said apertures.

4. The structure set forth in claim 3 wherein a substantial length of said second insert member is provided with a knurled gripping surface which a user may grasp with one hand when rotating said knob with the other hand.

* * * * *